Oct. 9, 1923.
A. A. MARTELL
FLOATING REAMER
Filed May 20, 1918
1,470,020
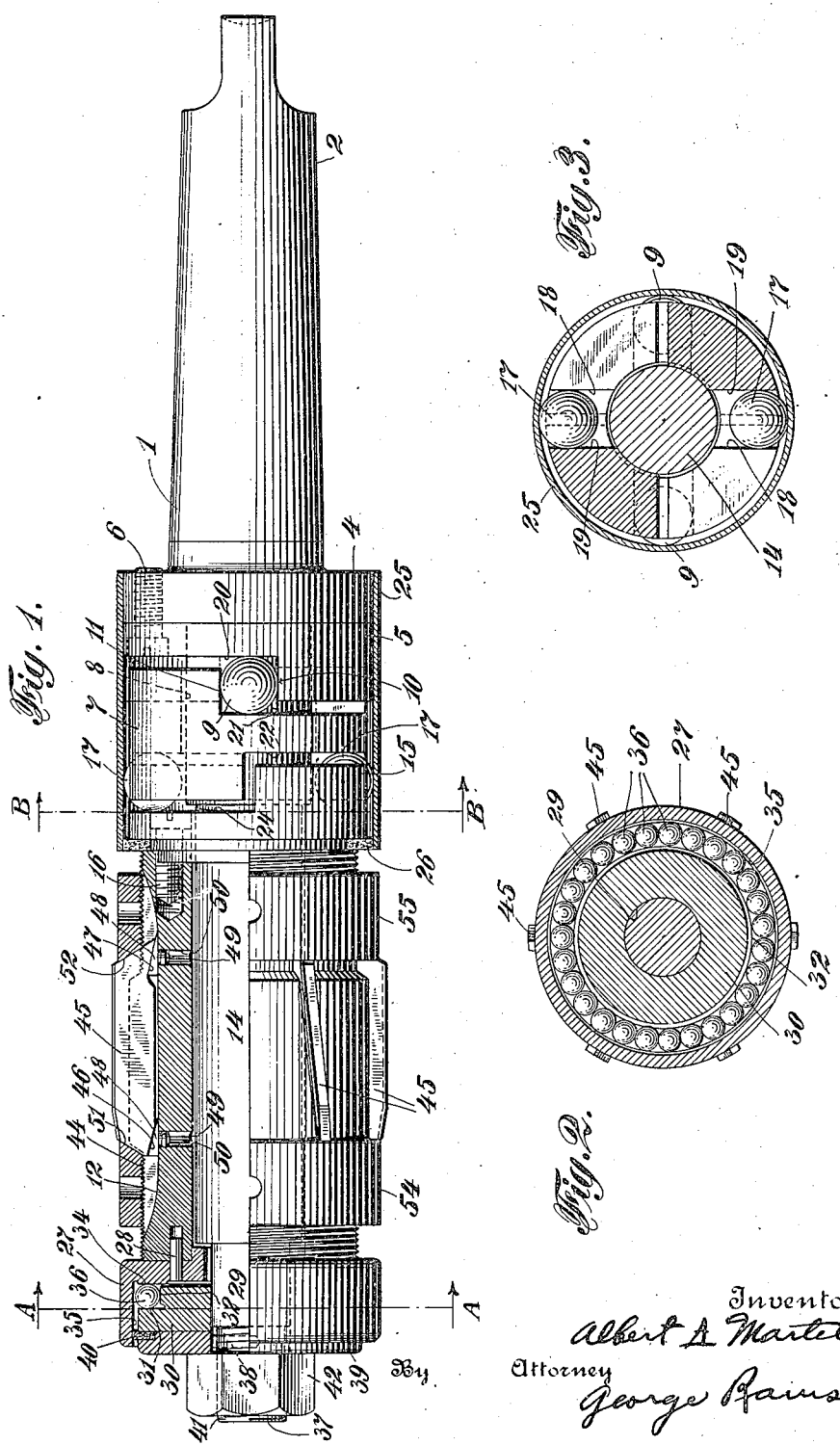

Patented Oct. 9, 1923.

1,470,020

UNITED STATES PATENT OFFICE.

ALBERT A. MARTELL, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

FLOATING REAMER.

Application filed May 20, 1918. Serial No. 235,502.

*To all whom it may concern:*

Be it known that I, ALBERT A. MARTELL, a citizen of the United States, residing at Woonsocket, in the county of Providence, State of Rhode Island, have invented certain new and useful Improvements in Floating Reamers, of which the following is a specification.

This invention relates broadly to tools and more particularly to reamers.

The principal object of this invention is to provide a reamer so mounted on a reamer shaft that the axis of the reamer may be displaced laterally from the axis of the reamer shaft and at the same time is maintained parallel to the axis of the reamer shaft.

A further object of the present invention is a reamer of the character specified wherein the reamer body is mounted to be laterally movable upon the reamer shaft, and the reamer body is capable of being rotated around its own axis independently of the axis of the reamer shaft.

A still further object of the present invention is a floating reamer of the character specified wherein the reamer body, within predetermined limits, is permitted free motion at right angles to the axis of the spindle of the machine tool carrying the reamer, and is restrained from angular deviation from that axis in such manner that a positive drive is provided for the reamer body without interfering with the free radial movement of the body relative to the axis of the reamer shaft.

More specifically the present invention comprises a floating reamer as specified and wherein an anti-friction coupling is provided between the reamer shaft and the body of the reamer.

Still more specifically the present invention comprises a floating reamer of the character specified and wherein the body of the reamer is loosely mounted on the reamer shaft with a thrust ball bearing between one end of the reamer body and the reamer shaft, and a ball bearing universal coupling between the other end of the body portion of the reamer and the reamer shaft in such manner that the body of the reamer is, within predetermined limits, freely laterally movable relative to the reamer shaft.

The present invention possesses many other advantageous features, some of which, with the foregoing, will be set forth more at length in the following description wherein will be outlined in full that form of the invention which I have selected for illustration in the drawings accompanying and forming a part of the present specification.

Reference will now be made to the drawings wherein like characters are used to represent like parts throughout the several figures thereof.

Figure 1 is a longitudinal view of the preferred form of my invention showing a portion thereof in section.

Figure 2 is a view taken on section line A—A.

Figure 3 is a view taken on section line B—B.

Heretofore in the art the customary manner of reaming openings, such as bearings, has been to mount the reamer body rigidly upon the reamer shaft whereby the axis of rotation of the reamer body was necessarily the axis of the reamer shaft. This requires the cutting edges of the blades to lie in a cylindrical surface, the axis of which coincides with the axis of the reamer shaft. Reamers for many purposes are mounted upon machine tools that carry tool holding spindles. The spindles are mounted in bearings and in substantially all cases may be displaced by sidewise pressure, in such manner that the axis of rotation of the spindle is a few thousandths of an inch off from the theoretical axis of the bearings of the machine. This is magnified at the end of the reamer shaft which extends outwardly or over-hangs the bearings and frame of the machine tool. This lateral displacement may be due to weights of the parts or it may be due to extraneous forces. Where such lateral displacement occurs it is substantially impossible to ream openings in such manner as to obtain a true opening within the tolerance of limits required by modern practice requiring fine workmanship.

The present invention overcomes the difficulties above set out by providing a construction wherein the reamer body is free to take up a true axial line so that the finished work is reamed concentric to the theoretical axis of the machine tool spindle carrying the reamer. This type of reamer is particularly useful in certain ordnance work and more especially in finishing cylinders for gasoline engines, such as are used for automobile engines and the like.

Referring now more particularly to the drawings, the present invention comprises a reamer shaft 1 which is provided with a taper shank 2 adapted to be inserted in the end of a suitable machine tool spindle. The reamer shaft 1 adjacent the shank is provided with an integral collar 4 to which is secured a stepped driving collar 5 by means of the machine screws 6. A stepped coupler ring 7 is loosely mounted on the stub shaft portion 8 of the reamer shaft and a pair of driving balls 9 are mounted between the steps or shoulders 10 on the collar 5 and the steps or shoulders 11 on the ring 7. The body portion 12 of the reamer extends over the elongated portion 14 of the reamer shaft and is bored out to such a size as to permit a free lateral movement of the body portion, within predetermined limits, on the portion 14 of the reamer shaft. A stepped driven collar 15 is secured to the end of the body portion 12 by means of machine screws 16 and a pair of driving balls 17 are mounted between the steps or shoulders 18 on the ring 7 and the steps or shoulders 19 on the collar 15. The pairs of driving balls 9 and 17 are preferably arranged in such manner that a line joining the centers of the balls 9 will be at right angles to a line joining the centers of the balls 17 and planes including the driving faces on either the steps 10 or 11 would be at right angles to planes including either the driving faces on steps 18 or 19. The collar 5 on the reamer shaft is provided with a thrust surface 20; the ring 7 has thrust surfaces 21 and 22; and the collar 15 is provided with a thrust surface 24. All of these thrust surfaces lie substantially in parallel planes that are at right angles to the axis of the reamer shaft. The foregoing description sets forth the construction of the ball bearing coupling member whereby the reamer shaft drives the reamer body and at the same time permits lateral movement of the body relatively to the said shaft, within predetermined limits.

In order to prevent dust and dirt from entering the ball coupling and disturbing its accuracy of action a casing 25 is carried by the collar 4 and cooperates with a soft felt ring 26 mounted on the body of the reamer to form a dust proof joint and protect the coupling members.

A cupped member 27 is fixedly mounted on the front end of the body portion and may be prevented from rotation thereon by means of dowel pins 28. The reamer shaft at its front end is reduced in size, from the diameter of the elongated portion 14, to comprise a short sub shaft 29 which carries a collar 30 on which are provided a pair of right angle surfaces 31 and 32 between which surfaces and the surfaces 34 and 35 on the cup 27 is mounted a plurality of anti-friction balls 36. The surfaces 31 and 34 are parallel to each other; and at right angles to the axis of the body portion of the reamer and to the axis of the reamer shaft. The end of the reamer shaft is still further reduced in size as at 37 and is drilled to receive the pin 38 which comprises a guide for preventing rotation of the clamp washer 39, which carries a soft felt washer 40 that co-operates with the cup 27 to prevent dust and dirt from entering the anti-friction bearing or between the reamer body and the reamer shaft. The outer end of the member 37 is threaded as at 41 to carry the assembly nut 42. It will be noted that the primary function of the anti-friction bearing at the front end of the reamer member is to permit a transverse movement of the front end of the reamer body relative to the reamer shaft and to constitute a guiding device for this purpose.

The reamer body 12 is provided with diagonal slots 44 in which are mounted the reamer blades 45. The arrangement of the slots 44 is such that the cutting edges of the blades when in the slots are angularly disposed relative to lines on the surface of the body parallel to the axis of the body, and inclined in such manner that blades on diametrically opposite sides of the body are inclined in the same direction and substantially the same amount, whereby the blades may be said to be mounted in pairs. By reference to Figures 1 and 2 it will be noted that the adjacent pairs of blades are oppositely inclined so that the cutting edge of one blade advances at an angle which is different from the cutting edge of the succeeding blade. This construction prevents chattering of the reamer since if one blade strikes a hard spot and tends to yield inwardly thereby forming a microscopic ridge, the succeeding blade cuts down this ridge without tending to ride over the same spot that caused the preceding blade to yield. This angular blade construction, more fully set out in my application, Serial No. 179,121, filed the 7th day of July, 1917, is of particular importance in the floating reamer comprising the subject matter of the present invention since the reamer body is freely movable laterally and a hard spot or imperfection in the metal being reamed would tend to cause the reamer body to move laterally and thus affect the reaming action on the diametrically opposite side from the flaw in the work piece. This reamer is unrestrained in lateral movement whereas reamers rigidly mounted on a shaft are restrained and such conditions as described might be more noticeable in this floating reamer than in the rigid type. The combination of the inclined blades with the floating reamer body, however, overcomes the difficulty specified.

The reamer blades preferably are inclined at their ends as at 46 and 47 and these inclinations are adapted to ride upon wedges 48 seated in the bases of the slots 44 and secured therein by means of the studs 49 extending into the openings 50. The ends of the reamer blades as at 51 and 52 are beveled and are adapted to co-operate with the beveled edges on the adjusting collars 54 and 55 that are screw-threaded on the body of the reamer. This construction permits radial adjustment of the blades for calibrating, grinding, and other purposes.

From the foregoing description it is evident that the anti-friction bearing at the front end of the reamer and the anti-friction driving clutch at the rear end of the reamer co-operate in such manner that the body of the reamer has a limited lateral movement relative to the reamer shaft and wherein the axis of the body of the reamer is maintained parallel to the axis of the reamer shaft. It will further be noted that this construction permits the reamer body to rotate on its own axis and to be driven by the reamer shaft even though the axis of the reamer body is not coincident with the axis of the reamer shaft.

What I claim is:

1. In a reamer, the combination of a reamer shaft, a reamer blade carrying body mounted upon said reamer shaft, said body being provided with a cylindrical opening having a diameter larger than the diameter of the reamer shaft which extends through said opening whereby said body is movable laterally on the said reamer shaft, means to prevent longitudinal movement of said reamer body on said shaft and to maintain the axis of said reamer body parallel to the axis of the reamer shaft, said means also comprising a driving connection between said reamer shaft and said reamer body, and adapted to sustain both thrust and torsion.

2. In a device of the character specified, the combination of a hollow reamer body, a reamer shaft extending through said body and of a less diameter than the opening in said body whereby said body is laterally movable on said shaft, in combination with guiding means between one end of said reamer body and said reamer shaft, anti-friction driving means between the other end of said reamer body and said reamer shaft adapted to sustain both thrust and torsion, said guiding means and said driving means constructed to maintain the axis of said body portion parallel to the axis of said reamer shaft.

3. A device of the character described comprising a blade carrying reamer body provided with a longitudinal cylindrical opening, the axis of said opening being coincident with the axis of the body, a plurality of reamer blades carried by said body, a reamer shaft extending through said cylindrical opening and with the diameter of the portion of the shaft extending through the opening being less than the diameter of the opening whereby said reamer body is laterally movable on said reamer shaft, in combination with a thrust bearing between the front end of said reamer body and said reamer shaft, and a universal coupler between the other end of said reamer body and said shaft whereby said reamer body is latterly movable within predetermined limits relatively to said reamer shaft and whereby the rotation of said reamer shaft rotates the reamer body.

4. In a device of the character specified the combination of a reamer body, a plurality of angularly disposed blades carried by said body with the angularity of the blades on one side of the body diametrically opposed to the angularity of the blades on the opposite side of the body and with the inclination of certain blades being different from the inclination of other blades, said body portion being provided with an opening, a reamer shaft extending through said opening, and driving guiding means operatively connecting said reamer body and said reamer shaft in such manner that said reamer body is laterally movable relatively to said reamer shaft and with the axis of said reamer body maintained at all times parallel to the axis of the reamer shaft.

5. In a device of the character specified a reamer body, a plurality of pairs of reamer blades mounted on said reamer body, said pairs of blades being diametrically disposed on opposite sides of the reamer body with the angularity of certain pairs of blades being different from the angularity of certain other pairs of blades so that the cutting edge of one blade cuts at a different angle from the next succeeding blade, said body portion being provided with a cylindrical opening extending longitudinally through said body portion, a reamer shaft having a portion thereof extending through said cylindrical opening and with said portion of less diameter than the diameter of said opening, means for maintaining the axis of the reamer body parallel to the axis of the reamer shaft and driving means for driving said reamer body.

6. In a device of the character specified a body portion, a shaft adapted to support said body portion, in combination with guiding and driving means connecting said body portion to said shaft whereby said body portion is freely movable within predetermined limits relatively to said shaft and with the axis of said body portion maintained at all times parallel to the axis of said shaft, said driving means comprising anti-friction members adapted to sustain both thrust and torsion.

7. In a device of the character specified, the combination of a reamer body, angularly disposed blades mounted in pairs on said reamer body with the angularity of one pair of the blades opposite to the angularity of the adjacent pair of blades, a driving shaft for said reamer body, in combination with driving and guiding means operatively connecting said shaft with said body whereby said body is freely movable laterally relative to said shaft and with the axis of said body at all times maintained parallel to the axis of the shaft.

8. In a device of the character described the combination of a reamer body, pairs of angularly disposed blades mounted on said reamer body with the angularity of certain blades different from the angularity of other blades, rotating means for driving said reamer body and guiding devices permitting lateral movement of said reamer body with the axis of said reamer body maintained at all times parallel to the axis of said rotating means.

9. In a device of the character described the combination of a reamer shaft, a reamer body loosely mounted on said reamer shaft, an anti-friction thrust bearing between one end of said reamer body and said shaft, and an anti-friction coupling member between the other end of said reamer body and said reamer shaft, said thrust bearing and said coupling being arranged to permit free radial movement of said reamer body relatively to said reamer shaft and to maintain the axis of rotation of said reamer body at all times parallel to the axis of rotation of said shaft.

10. In a device of the character specified, a driving shaft, a reamer body loosely mounted on said driving shaft, an anti-friction thrust bearing between one end of said reamer body and said reamer shaft, and an anti-friction coupling member operatively connecting said reamer body with said reamer shaft to permit said reamer body to be driven by said reamer shaft.

11. In a device of the character described the combination of a reamer body having a longitudinal opening therein, a reamer shaft extending through said longitudinal opening, a cupped member carried by one end of said reamer body, a ball supporting member carried by said reamer shaft and adjacent said cupped member, a plurality of anti-friction balls between the supporting member and the cupped member, a stepped collar carried by the other end of said reamer body, a stepped collar also carried by the reamer shaft, a stepped ring loosely mounted on said reamer shaft and between the said stepped collars and anti-friction balls between said ring and each of said collars.

12. In a device of the character described the combination of a reamer body carrying a plurality of cutting blades, a reamer shaft upon which said body is mounted for lateral movement, a thrust bearing between one end of said reamer body and said shaft, a stepped collar carried by the other end of the reamer body, a stepped collar carried by said reamer shaft, a stepped ring intermediate the said stepped collars, and a pair of anti-friction balls mounted between the first mentioned collar and the said ring, and another pair of anti-friction balls mounted between the second mentioned collar and said ring with straight lines joining the centres of the pairs of balls being at substantially right angles to each other.

13. In a device of the character specified a forming tool, a shaft for carrying and driving said forming tool, an anti-friction thrust bearing between one end of said forming tool and said shaft, and an anti-friction driving coupler between the other end of said tool and said shaft, whereby said tool is freely laterally movable within predetermined limits relatively to said shaft and whereby the axis of said tool is at all times maintained parallel to the axis of said shaft.

14. In a device of the character specified a finishing tool comprising a body portion, a shaft for driving said body portion, in combination with coupling guiding means between said shaft and said body portion, whereby said body portion is permitted a free lateral movement within predetermined limits relatively to said shaft, and with the axis of the body portion at all times parallel to the axis of said shaft.

15. In a device of the character specified a universal coupling member comprising a pair of stepped collars, a stepped ring mounted between said collars with the driving faces on the steps of the said ring arranged substantially at right angles to each other, a pair of driving balls between the driving faces on the other side of said ring and the other collar, and a casing surrounding said collars and said ring to retain the said balls in position.

16. In a floating reamer as specified, the combination of a driving shaft, a reamer body mounted for lateral movement relatively to said driving shaft, with an anti-friction coupling between said shaft and said reamer body, said anti-friction coupling comprising a stepped collar carried by said shaft, a stepped collar carried by said reamer body, a stepped ring loosely mounted on said shaft and between the stepped collars, the driving faces on said ring being arranged at substantially right angles to each other, a pair of driving balls between said stepped ring and the first mentioned stepped collar, a pair of driving balls between said ring and the second mentioned driving collar, and a casing surrounding said rings and maintaining said balls in position.

17. In a floating reamer of the character specified the combination of a reamer shaft, a reamer body, a plurity of pairs of blades angularly disposed on the said body portion, said body portion being provided with an opening, a shaft extending through said opening, a pair of anti-friction thrust bearings permitting lateral movement of said body relatively to said shaft, and thrust and torsion driving means for compelling said reamer body to rotate with the said shaft.

18. In a floating reamer of the character specified a reamer body provided with an opening, a reamer shaft extending through said opening, a plurality of cutting blades mounted on the body of said reamer, an anti-friction bearing between one end of said reamer shaft and said body, a coupling between the other end of said reamer shaft and said body, the driving faces of said coupling being in contact with anti-friction balls whereby a rotation of the reamer shaft toward the cutting faces of the blades causes said shaft to drive said body portion, and spaced apart contact faces on said coupling permitting a reverse turning of the reamer shaft within predetermined limits without turning the reamer body.

19. A floating reamer of the character specified comprising in combination a reamer body provided with an opening extending longitudinally thereof, a reamer shaft extending through said opening, an anti-friction bearing supporting one end of said reamer body and an anti-friction coupler adapted to drive said body by said shaft when said shaft is rotated in the direction of the cutting edges of the reamer blades, said coupler being constructed to permit a rotative movement in the opposite direction within predetermined limits without rotating the reamer body.

ALBERT A. MARTELL.